United States Patent
Brinen et al.

(10) Patent No.: US 7,192,902 B2
(45) Date of Patent: Mar. 20, 2007

(54) POLYMERIZATION PROCESS WITH MIXED CATALYST COMPOSITIONS

(75) Inventors: Jeffrey L. Brinen, League City, TX (US); Charles Cozewith, Bellaire, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 192 days.

(21) Appl. No.: 10/250,926

(22) PCT Filed: Nov. 16, 2001

(86) PCT No.: PCT/US01/43540

§ 371 (c)(1),
(2), (4) Date: Jul. 7, 2003

(87) PCT Pub. No.: WO02/060957

PCT Pub. Date: Aug. 8, 2002

(65) Prior Publication Data

US 2004/0048990 A1  Mar. 11, 2004

Related U.S. Application Data

(60) Provisional application No. 60/261,896, filed on Jan. 16, 2001.

(51) Int. Cl.
*C08F 4/6392* (2006.01)
*C08F 4/643* (2006.01)

(52) U.S. Cl. ............ 502/129; 502/117; 502/152; 526/113; 526/114; 526/118; 526/119; 526/160; 526/170; 526/943

(58) Field of Classification Search ............... 502/117, 502/129, 152; 526/113, 114, 118, 119, 160, 526/170
See application file for complete search history.

(56) References Cited

U.S. PATENT DOCUMENTS

| 4,740,550 A | 4/1988 | Foster et al. ............. 525/52 |
| 4,740,551 A | 4/1988 | Foster et al. ............. 525/52 |
| 4,937,299 A | 6/1990 | Ewen et al. ............ 526/119 |
| 5,077,255 A | 12/1991 | Welborn, Jr. ............ 502/104 |
| 5,237,025 A | 8/1993 | Benham et al. ........... 526/114 |
| 5,280,074 A | 1/1994 | Schreck et al. ........... 525/240 |
| 5,322,902 A | 6/1994 | Schreck et al. ........... 525/247 |
| 5,648,422 A | 7/1997 | Collina et al. ............ 525/52 |
| 5,684,097 A | 11/1997 | Palmroos et al. ........... 526/64 |
| 5,714,427 A | 2/1998 | Dolle Volker et al. ...... 502/117 |
| 5,723,399 A | 3/1998 | Takemoto et al. ......... 502/113 |
| 6,013,595 A | 1/2000 | Lhost et al. ............ 502/113 |
| 6,037,296 A | 3/2000 | Hsieh et al. ............ 502/113 |
| 6,051,525 A | 4/2000 | Lo et al. ............... 502/113 |
| 6,656,866 B2 * | 12/2003 | Wenzel et al. ............ 502/117 |

FOREIGN PATENT DOCUMENTS

| WO | WO 97 48735 | 12/1997 |
| WO | WO 98/10016 | 3/1998 |
| WO | WO 01 30860 | 5/2001 |

* cited by examiner

*Primary Examiner*—Roberto Rabago

(57) ABSTRACT

The application describes a mixed olefin polymerization catalyst composition comprising a support, a reaction product of at least one first organometallic compound and a first activator capable of rendering the first organometallic compound active for insertion polymerization, and at least one second organometallic compound, the activator incapable of rendering the second organometallic compound active for polymerization of the monomers. The mixed catalyst composition can be used to prepare a first polymer component in a first polymerization reactor stage and then, when an effective activator is added for the second organometallic compound, the catalyst composition can be used to prepare a second polymer composition that is homogeneously blended with the first polymer component.

5 Claims, No Drawings

POLYMERIZATION PROCESS WITH MIXED CATALYST COMPOSITIONS

CROSS REFERENCE TO RELATED APPLICATIONS

This application is a National Stage Application of International Application No. PCT/US01/43540, filed Nov. 16, 2001, which claims the benefit of Provisional Application No. 60/261,896, filed Jan. 16, 2001.

FIELD OF THE INVENTION

This invention relates to mixed catalyst compositions, methods for their production and their use in a multistage polymerization process. The invention particularly relates to the use of mixed catalysts in a multistage polymerization process suitable for the tailoring of polymer blends.

BACKGROUND OF THE INVENTION

Multistage polymerization processes have been used to make blends of two or more polymer components known as reactor polymer blends. See, for example, U.S. Pat. Nos. 4,740,550 and 4,740,551. A typical multistage polymerization process comprises: 1) in a first stage, polymerizing monomers with an active catalyst to polymerize a first polymer component; and 2) transferring the contents of the first stage into a second stage where the active catalyst from the first stage is used to make a second polymer component. See, for example, U.S. Pat. Nos. 5,280,074, 5,322,902 and 5,684,097 where a crystalline polyolefin component is prepared in liquid monomer in a first bulk slurry stage and a copolymer is prepared in a second gas phase stage. Typically the catalyst composition employed comprises one catalyst throughout the process and often this catalyst is particularly suited for making one of the polymer components but less suitable for making the other polymer component(s).

An alternative solution to this problem is to add a catalyst in the second polymerization which is different from the catalyst used in the first polymerization stage. A catalyst advantageous for making the first polymer component is added during the first polymerization stage and a second catalyst advantageous for making the second polymer component is added during the second stage. See, for example, U.S. Pat. No. 5,648,422. It addresses the use of a catalyst particularly suitable for the preparation of crystalline polypropylene is a first stage, or stages, with introduction of a second catalyst particularly suitable for making a copolymer selected for the final blend. The first transition metal catalyst may be deactivated, and the second is added with activator, typically a metallocene pre-contacted with an alumoxane activator. A drawback to this solution is the cumbersome step of adding an additional catalyst and activator and effectively having the second catalyst uniformly dispersed within the first polymer component such that the second copolymer component is prepared with an essentially uniform dispersal within the first polymer component.

Another solution to this problem is to use a mixed catalyst composition comprising two catalysts used throughout each polymerization stage. One of the two catalysts is advantageous for making a first polymer component of a reactor blend while the second catalyst is advantageous for making a second polymer component. See, for example, WO 98/10016. Other relevant art includes U.S. Pat. No. 5,714, 427. The drawback of such a solution is that both catalysts are active throughout any given stage of the polymerization process and the particular advantages of the two for the different polymer components can be diminished. Efforts have been made to selectively deactivate one of the catalysts but such a step is cumbersome and not preferable.

The above methods can be undesirable because the tailoring of final reactor blends is limited as described above. It is thus desirable to design a process which is particularly suitable both for making a first polymer component of a reactor blend and for making at least one other polymer component of a reactor blend.

SUMMARY OF THE INVENTION

The present invention relates to an olefin polymerization process suitable for preparing polyolefin blends including: A) contacting in a first polymerization stage one or more olefins with a mixed catalyst composition supported on porous, inert particulate material wherein the catalyst comprises a) at least one transition metal catalyst compound activated for polymerization by reaction with a noncoordinating anion precursor compound and b) at least one inactive transition metal catalyst compound that cannot be activated by said noncoordinating anion precursor compound; B) transferring the product of A) into a second stage, optionally after removing unreacted monomer, by-products, or other unwanted materials; C) modifying the mixed catalyst system of A) by adding into the second stage an effective alkylating compound for the b) transition metal catalyst compound; and D) contacting in this second stage one or more olefins, the same or different from those of A), with the modified mixed catalyst system of C).

An intermediate product of the invention, prepared in the first stage, is a supported mixed catalyst system comprising at least one transition metal catalyst compound active for olefin polymerization, at least one transition metal catalyst that is inactive for olefin polymerization, both being contained on a prepolymerized, inert support. This prepolymerized and supported mixed catalyst composition is suitable for storage, shipping and subsequent use when subjected to an alkylation modification and introduced into a polymerization medium with insertion polymerizable monomers.

The mixed catalyst composition comprises at least two different catalysts which may be introduced to a first polymerization stage along with the monomers. The mixed catalyst composition is selected so that when polymerization occurs in the first stage, at least one catalyst is active for polymerization while at least one other catalyst is inactive for polymerization. After polymerization, the contents of the first polymerization stage is subjected to a subsequent polymerization stage wherein previously inactive catalyst(s) of the mixed catalyst composition are activated for polymerization. There can be several additional stages besides those mentioned above, including the removal of unwanted by-products and unreacted monomer. The benefits of this invention include the ability to selectively activate a mixed catalyst composition and effectively tailor-make reactor polymer blends without adding additional catalysts or deactivating catalysts after the first polymerization stage. The intermediate product is a intimate mixture of the mixed catalyst in the first stage polymer which allows for second stage activation of the inactive catalyst without having to independently introduce it and undergo blending or rigorous mixing processes to try to achieve a desired homogenous mix or blend of the first stage and second stage polymers.

DETAILED DESCRIPTION OF THE INVENTION

Generally, this invention relates to a mixed catalyst composition comprising at least two different catalysts which are capable of being selectively activated. The mixed catalyst composition is used in a multistage polymerization process to make a reactor polymer blend comprising at least two polymer components. The mixed catalyst compounds are typically illustrated by metallocenes which can be used for a variety of olefin polymers but which can be selectively activated by virtue of containing i) hydrocarbyl labile ligands capable of activation by ionization mechanisms with noncoordinating anion precursor compounds and ii) halogen, alkoxy, or amido labile ligands which are not typically activated by the noncoordinating anion precursor compounds until or unless alkylated. Nonmetallocene transition metal compounds known in the art and capable of activation for olefin polymerization with noncoordinating anion precursor compounds are suitable as active catalysts in step A). Those typically activated only with alkylaluminum compounds, inclusive of alkylalumoxane compounds, and are suitable as the inactive catalysts of step A). Subsequent alkylation of the step A) inactive catalysts renders them capable of activation with the present noncoordinating anion precursor compounds for olefin polymerization and thus capable of polymerizing olefins contacted with the modified catalyst compound of step C).

Support Materials

The mixed catalyst compositions used in the process of this invention are preferably supported using a porous particulate material, such as for example, talc, inorganic oxides, inorganic chlorides and resinous materials such as polyolefin or polymeric compounds.

Preferred support materials are porous inorganic oxide materials, which include those from the Periodic Table of Elements of Groups 2, 3, 4, 5, 13 or 14 metal oxides. Silica, alumina, silica-alumina, and mixtures thereof are particularly preferred. Other inorganic oxides that may be employed either alone or in combination with the silica, alumina or silica-alumina are magnesia, titania, zirconia, and the like.

Typically, the inorganic oxide support material is porous silica which has a surface area in the range of from 10 to 700 $m^2/g$, a total pore volume in the range of from 0.1 to 4.0 cc/g and an average particle size in the range of from 10 to 500 μm. More preferably, the surface area is in the range of from 50 to 500 $m^2/g$, the pore volume is in the range of from 0.5 to 3.5 cc/g and the average particle size is in the range of from 20 to 200 μm. Most preferably the surface area is in the range of from 100 to 400 $m^2/g$, the pore volume is in the range of from 0.8 to 3.0 cc/g and the average particle size is in the range of from 30 to 100 μm. The average pore size of typical porous support materials is in the range of from 10 to 1000 Å. Preferably, a support material is used that has an average pore diameter of from 50 to 500 Å, and most preferably from 75 to 350 Å. It may be particularly desirable to dehydrate the silica at a temperature of from 100° C. to 800° C. anywhere from 3 to 24 hours.

Preferred polymeric supports typically comprise an essentially hydrocarbon polymeric compound, preferably of sufficiently low surface area so as to avoid excessive monomer access to the active catalyst sites, which sites are essentially uniformly distributed throughout the mass of the support by virtue of the randomly incorporated functional groups on the polymeric chains making up the support. The term low surface area means a surface area of $\leq 50$ $m^2/g$ as measured a single point nitrogen B.E.T. (Brunauer, S., Emmett, P. H., Teller, E., *JACS* 1938, 60, 309) and can be exemplified by the use of polystyrene based beads or gels. These beads or gels are lightly cross-linked and randomly functionalized with the ammonium salt compounds. Important features of these catalyst support compounds are insolubility in the solvents used in preparing the supported catalysts or in its use in polymerizing monomers, the particle size as related to effectiveness for use in fluidized bed reactors, and overall resistance to fracture under temperature pressure and loading requirements. Thus the support must be insoluble under normal polymerization operating conditions. Preferably the beads are in the form of spheres of uniform dimension and having a normal size range between 400 and 100 US Mesh sizing (30 to 100 micrometers).

Transition metal catalyst compounds, activator and support material may be combined to prepare the supported catalyst in any number of ways. Suitable support techniques are described in U.S. Pat. Nos. 4,701,432 and 4,808,561. Preferably the transition metal compounds and activator are combined and their reaction product supported on the porous support material as described in U.S. Pat. No. 5,240,894 and EP 705 281, EP 766 700, EP 766 702. Alternatively, the transition metal compounds may be preactivated separately and then combined with the support material either separately or together so long as at least one metallocene is left inactive in the mixed metallocene composition of this invention. If the transition metal compounds and activator are separately supported, then preferably they are dried and combined as a powder before use in polymerization. Preferably the step A) active catalyst is activated prior to being mixed with the step A) inactive catalyst so as to avoid potential interfering interactions. Thus the active catalyst may be on a portion of the inert support material and additional noncoordinating anion cocatalyst activator may be with the inactive catalyst on another portion of the inert support material, each having been prepared separately and combined prior to step A).

Regardless of whether the transition metal compound and activator are separately precontacted or whether the transition metal compound and activator are combined at once, the total volume of reaction solution applied to porous support is preferably less than 4 times the total pore volume of the porous support, more preferably less than 3 times the total pore volume of the porous support.

Exemplary methods of supporting ionic catalysts comprising metallocene cations and noncoordinating anions are described in WO 91/09882, WO 94/03506, WO 98/55518, EP 507 876, EP 702 700 and U.S. Pat. Nos. 5,427,991 and 5,643,847. The methods generally comprise either physical adsorption on traditional polymeric or inorganic supports that have been largely dehydrated and dehydroxylated, introducing coupling groups onto support substrates such that the noncoordinating anion, or precursor compound, is covalently bound to the support, or using neutral anion precursors that are sufficiently strong Lewis acids to activate hydroxy groups in the supports such that the Lewis acid becomes covalently bound and the hydrogen of the hydroxy group is available to protonate the metallocene compounds.

The supported mixed catalyst composition may be used directly in a polymerization reactor or the catalyst composition may be prepolymerized using methods well known in the art for subsequent use in polymerization. For details regarding prepolymerization, see U.S. Pat. Nos. 4,923,833 and 4,921,825, EP 279 863 and EP 354 893.

Metallocene Compounds

As used herein "metallocene" and "metallocene component" refer generally to compounds represented by the formula $Cp_mMR_nX_q$, wherein Cp is a cyclopentadienyl ring which may be substituted or unsubstituted, or derivative thereof which may be substituted or unsubstituted, M is a Group 3, 4, 5, or 6 transition metal, for example scandium, titanium, zirconium, hafnium, vanadium, niobium, tantalum, chromium, molybdenum and tungsten, R is a hydrocarbyl group or hydrocarboxy group having from one to 20 carbon atoms, X is independently selected from a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, preferably a $C_3$–$C_{10}$ organometalloid group, or a halogen atom, preferably chlorine, and m=1–3, n=0–3, q=0–3, and the sum of m+n+q is equal to the oxidation state of the transition metal.

Methods for making and using metallocenes are very well known in the art. For example, metallocenes are detailed in U.S. Pat. Nos. 4,530,914; 4,542,199; 4,769,910; 4,808,561; 4,871,705; 4,933,403; 4,937,299; 5,017,714; 5,026,798; 5,057,475; 5,120,867; 5,278,119; 5,304,614; 5,324,800; 5,350,723; and 5,391,790. Various methods for preparing metallocenes are fully described in the literature, see, e.g., *Journal of Organometallic Chem.*, volume 288, (1985), pages 63–67, and in EP-A-320762.

Activators

Metallocenes are generally used in combination with a cocatalyst activator so as to be effective for olefin polymerization. The term "activator" is defined herein to be any compound or component, or combination of compounds or components, capable of enabling the ability of one or more metallocenes to polymerize olefins to polyolefins. When X is a halogen in the metallocene represented by the formula $Cp_mMR_nX_q$ it is herein referred to as a labile halogen substituted metallocene. When X is not halogen it is herein referred to as a labile non-halogen substituted metallocene. In general, a labile halogen substituted metallocene can be activated by organoaluminum alkylating compounds, such as alumoxane, but cannot be activated by certain classes of non-coordinating anion (NCA) precursor compounds when used alone, or in the absence of or with trivial amounts of alkylating compounds.

Non-Coordinating Anions

Thus non-coordinating anion (NCA) precursors are useful to selectively activate the mixed catalyst of this invention. NCA precursors alone are not generally believed to be capable of forming an active catalyst with a labile halogen substituted metallocene, unless used in conjunction with an alkylating compound, and are therefore useful to selectively activate a labile non-halogen substituted metallocenes which are in mixtures with a labile halogen substituted metallocenes. NCA precursors are compounds which will react with at least one non-halogen ligand of a metallocene compound to produce a stable ion pair comprising a cationic metallocene compound and an anionic compound. The cationic metallocene complex is referred to as a transition metal cation. The anionic complex is referred to as a non-coordinating anion.

The term "non-coordinating anion" (NCA) means here an anion which either does not coordinate to said transition metal cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

Descriptions of ionic catalysts for coordination polymerization comprised of metallocene cations activated by non-coordinating anions appear in the early work in EP-A-0 277 003, EP-A-0 277 004, U.S. Pat. Nos. 5,198,401 and 5,278, 119, and WO92/00333. These teach a preferred method of preparation wherein metallocenes are protonated by non-coordinating anion precursors such that an alkyl group is abstracted from a transition metal to make it both cationic and charge-balanced by the non-coordinating anion. The use of ionizing ionic compounds not containing an active proton but capable of producing both the active metallocene cation and a non-coordinating anion is also known. See, EP-A-0 426 637, EP-A-0 573 403 and U.S. Pat. No. 5,387,568. Reactive cations other than Bronsted acids capable of ionizing the metallocene compounds include ferrocenium triphenylcarbonium and triethylsilylium cations. Any metal or metalloid capable of forming a coordination complex which is resistant to degradation by water (or other Bronsted or Lewis Acids) may be used or contained in the anion of the second activator compound. Suitable metals include, but are not limited to, aluminum, gold, platinum and the like. Suitable metalloids include, but are not limited to, boron, phosphorus, silicon and the like.

An additional method of making the ionic catalysts uses ionizing non-coordinating anion precursors which are initially neutral Lewis acids but form the cation and anion upon ionizing reaction with the metallocene compounds, for example tris(pentafluorophenyl) boron acts to abstract an alkyl, hydride or silyl ligand to yield a metallocene cation and stabilizing non-coordinating anion, see EP-A-0 427 697 and EP-A-0 520 732. Ionic catalysts for addition polymerization can also be prepared by oxidation of the metal centers of transition metal compounds by anionic precursors containing metallic oxidizing groups along with the anion groups, see EP-A-0 495 375.

Examples of suitable NCA precursors capable of activating labile non-halogen substituted metallocene compounds via ionic cationization, and consequent stabilization with a resulting non-coordinating anion include trialkyl-substituted ammonium salts such as:
trimethylammonium tetrakis(p-tolyl)borate,
trimethylammonium tetrakis(o-tolyl)borate,
tributylammonium tetrakis(pentafluorophenyl)borate,
tripropylammonium tetrakis(o,p-dimethylphenyl)borate,
tributylammonium tetrakis(m,m-dimethylphenyl)borate, tributylammonium tetrakis(p-trifluoromethylphenyl)borate,
tributylammonium tetrakis(pentafluorophenyl)borate,
tri(n-butyl)ammonium tetrakis(o-tolyl)borate and the like;
N,N-dialkyl anilinium salts such as:
N,N-dimethylanilinium tetrakis(pentafluorophenyl)borate,
N,N-dimethylaniliniumtetrakis(heptafluoronaphthyl)borate,
N,N-dimethylanilinium tetrakis(perfluoro-4-biphenyl)borate and the like;

dialkyl ammonium salts such as:
di-(isopropyl)ammonium tetrakis(pentafluorophenyl)borate and the like;
and triaryl phosphonium salts such as:
triphenylphosphonium tetrafluorophenylborate,
tri(methylphenyl)phosphonium tetraphenylborate,
tri(dimethylphenyl)phosphonium tetraphenylborate and the like.

Further examples of suitable NCA precursors include those comprising a stable carbonium ion, and a compatible non-coordinating anion. These include:
triphenylcarbenium tetrakis (trifluorophenyl) borate
tropillium tetrakis(pentafluorophenyl)borate,
triphenylmethylium tetrakis(pentafluorophenyl)borate,
benzene (diazonium) tetrakis(pentafluorophenyl)borate,
tropillium phenyltris(pentafluorophenyl)borate,
triphenylmethylium phenyl-(trispentafluorophenyl)borate,
benzene (diazonium) phenyl-tris(pentafluorophenyl)borate,
tropillium tetrakis(2,3,5,6-tetrafluorophenyl)borate,
triphenylmethylium tetrakis(2,3,5,6-tetrafluorophenyl)borate,
benzene (diazonium) tetrakis(3,4,5-trifluorophenyl)borate,
tropillium tetrakis(3,4,5-trifluorophenyl)borate,
benzene (diazonium) tetrakis(3,4,5-trifluorophenyl)borate,
tropillium tetrakis(3,4,5-trifluorophenyl)aluminate,
triphenylmethylium tetrakis(3,4,5-trifluorophenyl)aluminate,
benzene (diazonium) tetrakis(3,4,5-trifluorophenyl)aluminate,
tropillinum tetrakis(1,2,2-trifluoroethenyl)borate,
triphenylmethylium tetrakis(1,2,2-trifluoroethenyl)borate,
benzene (diazonium) tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl)borate,
benzene (diazonium) tetrakis(2,3,4,5-tetrafluorophenyl)borate, and the like.

Alumoxanes

In a preferred embodiment, after a first stage polymerization, a mixed catalyst composition which comprises at least one active and one inactive catalyst can be contacted with an alumoxane activator such as alkylalumoxane in order to activate the inactive catalyst. Alkylalumoxanes are preferably used as activators, most preferably methylalumoxane (MAO). The alumoxane component useful as catalyst activator typically is an oligomeric aluminum compound represented by the general formula $(R-Al-O)_n$, which is a cyclic compound, or $R(R-Al-O)_n AlR_2$, which is a linear compound. Generally, the alkylalumoxanes preferred for use in olefin polymerization contain 5 to 40 of the repeating units (R—Al—O), where each is R is independently a $C_1-C_8$, alkyl including mixed alkyls. Particularly preferred are the compounds in which R is a low carbon-number alkyl such as methyl or ethyl. Alumoxane solutions, particularly methylalumoxane solutions, may be obtained from commercial vendors as solutions having various concentrations. Modified alumoxanes known in the industry are also suitable. There are a variety of methods for preparing alumoxane, non-limiting examples of which are described in U.S. Pat. Nos. 4,665,208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031 and EP-A-0 561 476, EP-B1-0 279 586, EP-A-0 594-218 and WO 94/10180. (as used herein unless otherwise stated "solution" refers to any mixture including suspensions.)

Mixed Catalyst Composition

The mixed catalyst composition of this invention preferably comprises at least two catalysts: at least one Catalyst-A, capable of being activated with an NCA precursor; and at least one Catalyst-B, incapable of being activated solely with an NCA precursor. Preferably Catalyst-B is subsequently activated with an alumoxane, preferably MAO. Catalyst-B may also be converted into a compound capable of being subsequently activated with an NCA precursor, such as by adding in the second stage an organoaluminum alkylating compound, such as triisobutyl aluminum, optionally with amounts of an NCA precursor additional to that present from the first stage. The mixed catalyst as activated in stages is used in a multistage polymerization process to make a reactor polymer blend.

The catalyst compounds, prior to activation, are selected so as to prepare reactor polymer blends. The reactor polymer blends typically comprise at least two components: component-one and component-two. Catalyst-A is preferably a metallocene compound which is effective for making component-one. Catalyst-B is preferably a metallocene compound which is effective for making component-two. Selection of activator and the labile ligands on the metal center of each metallocene compound in the mixed catalyst composition allows the practitioner to selectively activate either Catalyst-A or Catalyst-B for polymerization. A preferred activating compound for Catalyst-A is a non-coordinating anion (NCA) precursor discussed above. Generally, NCA precursors form an active catalyst with a metallocene compounds having labile ligands that are non-halogen (labile non-halogen substituted metallocene), e.g. dialkyl substituted metallocene.

Thus, one embodiment of this invention is a mixed metallocene catalyst composition wherein: one catalyst, Catalyst-B, is a metallocene compound whose labile ligands are halogen (labile, halogen substituted metallocene) while the other catalyst, Catalyst-A, is a metallocene compound whose labile ligands are not halogen (labile non-halogen substituted metallocene). When the mixed metallocene is contacted with NCA precursors in or prior to a first polymerization stage, Catalyst-B, the labile halogen substituted metallocene, is not believed to form an active catalyst with NCA precursors. Catalyst-A, the labile non-halogen substituted metallocene, e.g. hydridyl or alkyl substituted, does form an active catalyst with the NCA. A first stage polymerization can then occur with a catalyst composition comprising the reaction product of Catalyst-A and an NCA precursor, plus Catalyst-B. Catalyst-A becomes activated via the NCA precursor while Catalyst-B, a labile halogen substituted metallocene, remains inactive unit activated after the first stage with an activating compound, preferably an alumoxane.

In the most preferred embodiment of this invention, the mixed catalyst composition comprises Catalyst-A and Catalyst-B wherein Catalyst-A is a non-halogen substituted metallocene, which is capable of making stereospecific polypropylene; and Catalyst-B is a metallocene, preferably a labile halogen substituted metallocene, which is capable of making an semicrystalline, amorphous or elastomeric copolymer, preferably ethylene propylene copolymer.

Catalyst-A

Preferred metallocenes for Catalyst-A are biscyclopentadienyl metallocenes represented by the formula:

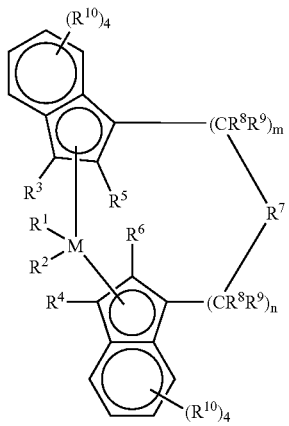

wherein M is a metal of Group 4, 5, or 6 of the Periodic Table, preferably, zirconium, hafnium and titanium, and most preferably zirconium.

$R^1$ and $R^2$ are identical or different, preferably identical, and are one of a hydrogen atom, a $C_1$–$C_{10}$ alkyl group, preferably a $C_1$–$C_3$ alkyl group, a $C_1$–$C_{10}$ alkoxy group, preferably a $C_1$–$C_3$ alkoxy group, a $C_6$–$C_{10}$ aryl group, preferably a $C_6$–$C_8$ aryl group, a $C_6$–$C_{10}$ aryloxy group, preferably a $C_6$–$C_8$ aryloxy group, a $C_2$–$C_{10}$ alkenyl group, preferably a $C_2$–$C_4$ alkenyl group, a $C_7$–$C_{40}$ arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, or a halogen, preferably chlorine, and a $C_4$–$C_{20}$ organometalloid group.

$R^5$ and $R^6$ are identical or different, preferably identical, are one of a halogen atom, preferably a fluorine, chlorine or bromine atom, a $C_1$–$C_{10}$ alkyl group, preferably a $C_1$–$C_4$ alkyl group, which may be halogenated, a $C_6$–$C_{10}$ aryl group, which may be halogenated, preferably a $C_6$–$C_8$ aryl group, a $C_2$–$C_{10}$ alkenyl group, preferably a $C_2$–$C_4$ alkenyl group, a $C_7$–$C_{40}$ -arylalkyl group, preferably a $C_7$–$C_{10}$ arylalkyl group, a $C_7$–$C_{40}$ alkylaryl group, preferably a $C_7$–$C_{12}$ alkylaryl group, a $C_8$–$C_{40}$ arylalkenyl group, preferably a $C_8$–$C_{12}$ arylalkenyl group, a —$NR_2^{15}$, —$SR^{15}$, —$OR^{15}$, —$OSiR_3^{15}$ or —$PR_2^{15}$ radical, wherein $R^{15}$ is one of a halogen atom, preferably a chlorine atom, a $C_1$–$C_{10}$ alkyl group, preferably a $C_1$–$C_3$ alkyl group, or a $C_6$–$C_{10}$ aryl group, preferably a $C_6$–$C_9$ aryl group.

$R^7$ is

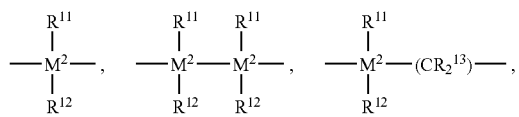

-continued

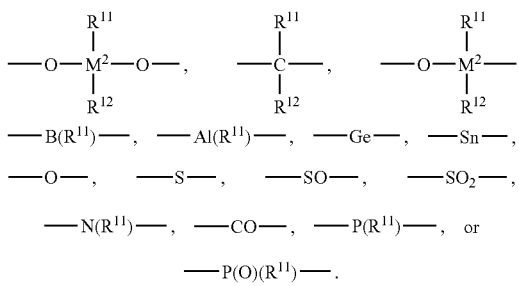

$R^{11}$, $R^{12}$ and $R^{13}$ are identical or different and are a hydrogen atom, a halogen atom, a $C_1$–$C_{20}$ alkyl group, preferably a $C_1$–$C_{10}$ alkyl group, a $C_1$–$C_{20}$ fluoroalkyl group, preferably a $C_1$–$C_{10}$ fluoroalkyl group, a $C_6$–$C_{30}$ aryl group, preferably a $C_6$–$C_{20}$ aryl group, a $C_6$–$C_{30}$ fluoroaryl group, preferably a $C_6$–$C_{20}$ fluoroaryl group, a $C_1$–$C_{20}$ alkoxy group, preferably a $C_1$–$C_{10}$ alkoxy group, a $C_2$–$C_{20}$ alkenyl group, preferably a $C_2$–$C_{10}$ alkenyl group, a $C_7$–$C_{40}$ arylalkyl group, preferably a $C_7$–$C_{20}$ arylalkyl group, a $C_8$–$C_{40}$ arylalkenyl group, preferably a $C_8$–$C_{22}$ arylalkenyl group, a $C_7$–$C_{40}$ alkylaryl group, preferably a $C_7$–$C_{20}$ alkylaryl group or $R^{11}$ and $R^{12}$, or $R^{11}$ and $R^{13}$, together with the atoms binding them, form ring compositions.

$M^2$ is silicon, germanium or tin, preferably silicon or germanium, most preferably silicon. $R^8$ and $R^9$ are identical or different and have the meanings stated for $R^{11}$. The values of m and n are identical or different and are zero, 1 or 2, preferably zero or 1, m plus n being zero, 1 or 2, preferably zero or 1. Finally, the radicals $R^3$, $R^4$, and $R^{10}$ are identical or different and have the meanings stated for $R^{11}$, $R^{12}$ and $R^{13}$. Two adjacent $R^{10}$ radicals can be joined together to form a ring composition, preferably a ring composition containing from 4–6 carbon atoms.

Alkyl refers to straight or branched chain substituents. Halogen (halogenated) refers to fluorine, chlorine, bromine or iodine atoms, preferably fluorine or chlorine.

The most preferred metallocenes for Catalyst-A are those that are advantageous for making stereoregular polypropylene, preferably isotactic polypropylene, and are represented by structures (A) and (B):

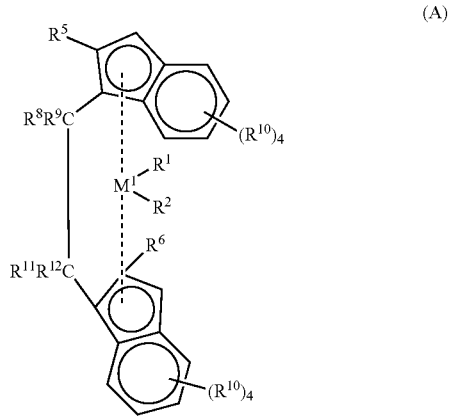

(A)

-continued (B)

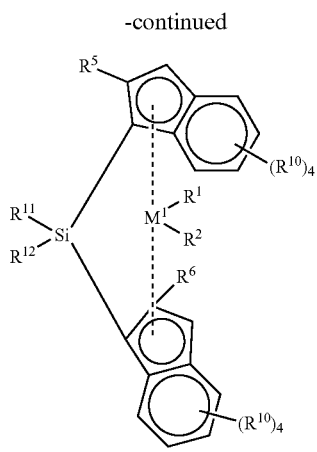

wherein M¹ is Zr or Hf, R¹ and R² are methyl or chlorine, and R⁵, R⁶, R⁸, R⁹, R¹⁰, R¹¹ and R¹² have the above-mentioned meanings.

These chiral metallocenes may be used as a racemate mixture for the preparation of highly isotactic polypropylene copolymers. It is also possible to use the pure R or S form. An optically active polymer can be prepared with these pure stereoisomeric forms. Preferably the meso form of the metallocene is removed to ensure the center (i.e., the metal atom) provides stereoregular polymerization. Separation of the stereoisomers can be accomplished by known literature techniques. For special products it is also possible to use rac/meso mixtures.

Illustrative but non-limiting examples of preferred metallocenes include:
Dimethylsilandiylbis(2-methyl-4-phenyl-1-indenyl)ZrX₂
Dimethylsilandiylbis(2-methyl-4,5-benzoindenyl)ZrX₂;
Dimethylsilandiylbis(2-methyl-4,6-diisopropylindenyl)ZrX₂;
Dimethylsilandiylbis(2-ethyl-4-phenyl-1-indenyl)ZrX₂;
Dimethylsilandiylbis(2-ethyl-4-naphthyl-1-indenyl)ZrX₂,
Phenyl(methyl)silandiylbis(2-methyl-4-phenyl-1-indenyl)ZrX₂,
Dimethylsilandiylbis(2-methyl-4-(1-naphthyl)-1-indenyl)ZrX₂,
Dimethylsilandiylbis(2-methyl-4-(2-naphthyl)-1-indenyl)ZrX₂,
Dimethylsilandiylbis(2-methyl-indenyl)ZrX₂,
Dimethylsilandiylbis(2-methyl-4,5-diisopropyl-1-indenyl)ZrX₂,
Dimethylsilandiylbis(2,4,6-trimethyl-1-indenyl)ZrX₂,
Phenyl(methyl)silandiylbis(2-methyl-4,6-diisopropyl-1-indenyl)ZrX₂,
1,2-Ethandiylbis(2-methyl-4,6-diisopropyl-1-indenyl)ZrX₂,
1,2-Butandiylbis(2-methyl-4,6-diisopropyl-1-indenyl)ZrX₂,
Dimethylsilandiylbis(2-methyl-4-ethyl-1-indenyl)ZrX₂,
Dimethylsilandiylbis(2-methyl-4-isopropyl-1-indenyl)ZrX₂,
Dimethylsilandiylbis(2-methyl-4-t-butyl-1-indenyl)ZrX₂,
Phenyl(methyl)silandiylbis(2-methyl-4-isopropyl-1-indenyl)ZrX₂,
Dimethylsilandiylbis(2-ethyl-4-methyl-1-indenyl)ZrX₂,
Dimethylsilandiylbis(2,4-dimethyl-1-indenyl)ZrX₂,
Dimethylsilandiylbis(2-methyl-4-ethyl-1-indenyl)ZrX₂,
Dimethylsilandiylbis(2-methyl-α-acenaphth-1-indenyl)ZrX₂,
Phenyl(methyl)silandiylbis(2-methyl-4,5-benzo-1-indenyl)ZrX₂,
Phenyl(methyl)silandiylbis(2-methyl-4,5-(methylbenzo)-1-indenyl)ZrX₂,
Phenyl(methyl)silandiylbis(2-methyl-4,5-(tetramethylbenzo)-1-indenyl)ZrX₂,
Phenyl(methyl)silandiylbis(2-methyl-a-acenaphth-1-indenyl)ZrX₂,
1,2-Ethandiylbis(2-methyl-4,5-benzo-1-indenyl)ZrX₂,
1,2-Butandiylbis(2-methyl-4,5-benzo-1-indenyl)ZrX₂,
Dimethylsilandiylbis(2-methyl-4,5-benzo-1-indenyl)ZrX₂,
1,2-Ethandiylbis(2,4,7-trimethyl-1-indenyl)ZrX₂,
Dimethylsilandiylbis(2-methyl-1-indenyl)ZrX₂,
1,2-Ethandiylbis(2-methyl-1-indenyl)ZrX₂,
Phenyl(methyl)silandiylbis(2-methyl-1-indenyl)ZrX₂,
Diphenylsilandiylbis(2-methyl-1-indenyl)ZrX₂,
1,2-Butandiylbis(2-methyl-1-indenyl)ZrX₂,
Dimethylsilandiylbis(2-ethyl-1-indenyl)ZrX₂,
Dimethylsilandiylbis(2-methyl-5-isobutyl-1-indenyl)ZrX₂,
Phenyl(methyl)silandiylbis(2-methyl-5-isobutyl-1-indenyl)ZrX₂,
Dimethylsilandiylbis(2-methyl-5-t-butyl-1-indenyl)ZrX₂,
Dimethylsilandiylbis(2,5,6-trimethyl-1-indenyl)ZrX₂, and the like;

wherein X may be a halogen or an alkyl, preferably alkyl or alkylidene when used as Catalyst A.

These preferred metallocene catalyst components are described in detail in U.S. Pat. Nos. 5,145,819; 5,243,001; 5,239,022; 5,329,033; 5,296,434; 5,276,208; 5,672,668, 5,304,614 and 5,374,752; and EP 549 900 and 576 970; and WO98/22486. Additionally, metallocenes such as those described in U.S. Pat. Nos. 5,510,502 and 5,527,929.

Alternatively, a metallocene capable of making syndiotactic propylene and having non-halogen labile ligands can be effectively used as Catalyst A. Such metallocenes are known in the art, as are methods of making them. See, for example, U.S. Pat. Nos. 4,892,851, 5,132, 381, and 5,155, 080.

Catalyst-B

Catalyst B can be any metallocene known to be suitable for olefin polymerization, particularly those that are effective for making a different polymer component that is made by Catalyst A. Effective blends, in the sense of being well blended directly from the last reactor without additional mixing or blending, can thus be prepared that encompass such obvious variants as polypropylene blends, where two or more components are essentially crystalline but differ in one or more polymer properties such as molecular weight and crystallinity. Thus, catalysts described above for Catalyst A, so long as differently selected than that specifically selected as Catalyst A, and, as well, differing in their labile ligands, can be effectively utilized as a Catalyst B.

A particularly preferred class of metallocenes for Catalyst-B are represented by the formula $(Cp^1R^1{}_m)R^3{}_n(E_rR^2)MX_s$ wherein Cp is a cyclopentadienyl ring which may be substituted, or derivative thereof which may be substituted, R¹ is, each independently, a halogen or a hydrocarbyl, halocarbyl, hydrocarbyl-substituted organometalloid or halocarbyl-substituted organometalloid group containing up to 20 carbon atoms, "m" is 0 to 5, and two R¹ substituents on adjacent carbon atoms of the cyclopentadienyl ring associated there with can be joined together to form a ring containing from 4 to 20 carbon atoms, R³ is a bridging group, "n" is 0 to 3, M is a transition metal having a valence of from 3 to 6, preferably from group 4, 5, or 6 of the periodic table of the elements and is preferably in its highest oxidation state, E is a heteroatom containing group in which the heteroatom is an element with a coordination number of three from Group VA or a coordination number of two from group VIA preferably nitrogen, phosphorous, oxygen, or sulfur, $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when E is three coordinate and unbridged there may be two $R^2$ groups on E each independently a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to 20 carbon atoms, "s" is equal to the valence of M minus 2.

When X is a halogen it is herein referred to as a labile halogen substituted metallocene. When X is a not halogen it is herein referred to as a labile non-halogen substituted metallocene. In one embodiment, X is a halogen in Catalyst B, and X is not a halogen in Catalyst A when used together.

The Catalyst-B is preferably a metallocene having only one Cp ring composition as a ligand as shown above and is referred to as a monocyclopentadienyl metallocene. The Cp ligand forms a half-sandwich complex with the metal and can be free to rotate (unbridged) or locked into a rigid configuration through a bridging group to a heteroatom-containing ligand (E). The Cp ring ligand can be unsubstituted, substituted, or a derivative thereof such as a heterocyclic ring composition which may be substituted, and the substitutions can be fused to form other saturated or unsaturated rings compositions such as tetrahydroindenyl, indenyl, or fluorenyl ring compositions. The heteroatom containing ligand (E) is bound to both the metal and optionally to the Cp ligand through the bridging group. The heteroatom itself is an atom with a coordination number of three from group VA or VIA of the periodic table of the elements.

Examples of suitable monocyclopentadienyl metallocenes for use in Catalyst-B of the mixed catalyst composition of this invention are disclosed in U.S. Pat. Nos. 5,026,798; 5,057,475; 5,350,723; 5,264,405; 5,055,438 and are described in publication WO 96/002244.

The most preferable metallocenes for Catalyst-B are metallocenes which are advantageous for making amorphous or elastomeric copolymers, especially ethylene propylene copolymer. For this reason monocyclopentadienyl metallocenes are more preferred.

Illustrative, but not limiting, examples of preferred monocyclopentadienyl metallocenes for use in this invention's mixed catalyst composition are:

μ-$(CH_3)_2$Si(cyclopentadienyl)(1-adamantylamido)$M(R)_2$

μ-$(CH_3)_2$Si(3-tertbutylcyclopentadienyl)(1-adamantylamido)$M(R)_2$

μ-$(CH_2$(tetramethylcyclopentadienyl)(1-adamantylamido) $M(R)_2$

μ-$(CH_3)_2$Si(tetramethylcyclopentadienyl)(1-adamantylamido)$M(R)_2$

μ-$(CH_3)_2$C(tetramethylcyclopentadienyl)(1-adamantylamido)$M(R)_2$

μ-$(CH_3)_2$Si(tetramethylcyclopentadienyl)(1-tertbutylamido) $M(R)_2$

μ-$(CH_3)_2$Si(fluorenyl)(1-tertbutylamido)$M(R)_2$

μ-$(CH_3)_2$Si(tetramethylcyclopentadienyl)(1-cyclododecylamido)$M(R)_2$

μ-$(C_6H_5)_2$C(tetramethylcyclopentadienyl)(1-cyclododecylamido)$M(R)_2$;

wherein M is selected from a group consisting of Ti, Zr, and Hf and wherein R is selected from halogen or $C_1$ to $C_5$ alkyl, a methyl group in one embodiment.

Catalyst-B may also comprise biscyclopentadienyl metallocenes but preferably Catalyst-B only comprises biscyclopentadienyl metallocenes when they are advantageous for making semicrystalline, elastomeric or amorphous copolymers, especially ethylene propylene copolymers. Examples of such metallocenes are the meso isomers of the biscyclopentadienyl metallocenes described above. Other catalysts suitable for use as Catalyst-B are found in WO 96/23010.

Methods of Using Mixed Catalyst Composition

The mixed catalyst composition of this invention is used to make a reactor polymer blend made through a multistage polymerization process comprising: a first stage wherein a first set of monomers is polymerized with the mixed catalyst composition. The mixed catalyst composition comprises Catalyst-A and Catalyst-B as both defined above. During the first stage Catalyst-A is active while Catalyst-B is inactive for polymerization. The multistage process further comprises a subsequent stage wherein additional monomer is added to the contents of the first stage but subsequent to it, and polymerization is conducted in one or more additional stages wherein Catalyst-B becomes active for polymerization.

As explained in detail above, preferably Catalyst-A is a labile non-halogen substituted metallocene, preferably dialkyl substituted, while Catalyst-B is a labile halogen substituted metallocene, preferably dichloride substituted. Before or during the first polymerization stage, an NCA precursor is preferably added as an activator. The NCA precursor only activates Catalyst-A and leaves Catalyst-B inactive when polymerization is conducted in the first stage. Although it is preferable for Catalyst-B to be a labile halogen substituted metallocene, Catalyst-B may be any catalyst incapable of being activated by NCA precursors alone but capable of activation by other means. During the second polymerization stage, an activator, preferably an alumoxane, more preferably MAO, is added to activate Catalyst-B.

Alternatively, Catalyst-B may be modified before the subsequent stage so that Catalyst-B becomes capable of activation with NCA precursors. When Catalyst-B is an inactive labile halogen substituted metallocene, it can be made active by substituting the halogen ligands with ligands which are capable of ionizing abstraction with NCA precursors. This is hereafter referred to as conversion of an inactive catalyst. Conversion may be conducted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with labile halogen substituted metallocene compounds prior to or with the addition of activating anionic compounds. For example, an aluminum alkyl compound may be mixed with the mixed metallocene catalyst composition and any other contents from the first stage polymerization. This converts the inactive labile halogen substituted metallocene (Catalyst-B) into a compound capable of forming an active catalyst with NCA precursors. NCA precursors present from the first stage can be used to active the converted catalyst or more NCA precursors can be added. However, it is more preferable to leave Catalyst-B unmodified and added an activating compound in the subsequent polymerization stage such as MAO.

The mixed catalyst composition of this invention may be used in any type of polymerization process such as well known processes of solution, slurry, gas phase, and combinations thereof. These well known processes may be used in any stage of a polymerization used the mixed catalyst. The mixed catalyst composition may be used in a batch, continuous, or semi-continuous process.

In a preferred embodiment, the mixed catalyst composition is used in a multistage polymerization process wherein monomers are chosen for each stage in order to make a reactor polymer blend comprising an intimate mixture of at least two components which are typically immiscible to one another. Examples of these reactor polymer blends include, among others, blends of: 1) crystalline polypropylene or polyethylene with a semicrystalline, amorphous or elastomeric ethylene/higher alpha-olefin copolymer, 2) crystalline polypropylene with amorphous polypropylene, 3) crystalline polypropylene or polyethylene with styrene, and 4) crystalline polypropylene or polyethylene with ethylvinyl acetate or ethylmethacrylate.

One preferable method of using the mixed catalyst composition is to make a reactor polymer blend comprising stereoregular polypropylene, preferably isotactic polypropylene; and an amorphous or elastomeric copolymer, preferably ethylene propylene copolymer, ethylene comprising 20–85 mol % of the copolymer. When isotactic polypropylene is made in a first stage and an amorphous or elastic ethylene propylene copolymer is made in a subsequent stage, a modified impact polypropylene is made.

A preferable multistage process for making modified impact polypropylene with the mixed catalyst composition of this invention comprises: in a first stage, a predominately stereospecific propylene, preferably isotactic polypropylene, is polymerized from liquid monomers; and in a subsequent stage, an amorphous or elastomeric copolymer, preferably ethylene-propylene, is polymerized in the gas phase. An intermediate second stage is preferably performed to make more predominately stereospecific polypropylene from liquid monomers, preferably Catalyst B is inactive through the intermediate stage as well but is activated for the subsequent stage. An example of an intermediate stage process suitable for adoption in accordance with the invention is found in U.S. Pat. No. 5,280,074.

The preferred mixed catalyst composition for making impact modified polypropylene comprises: a polypropylene advantageous Catalyst-A, i.e. a catalyst that is particularly efficient at stereospecifically polymerizing propylene, preferably isotactic polypropylene; and an amorphous or elastomeric copolymer advantageous Catalyst-B, i.e. a catalyst that is particularly efficient at making amorphous or elastomeric copolymers, especially ethylene-propylene. In the first stage or any additional stage where predominately stereospecific polypropylene is made, preferably only Catalyst-A is active for polymerization while Catalyst-B remains inactive for polymerization. In any subsequent stage where amorphous or elastomeric copolymer is made, Catalyst-B preferably becomes active for polymerization.

The predominately stereospecific polypropylene is preferably made in one or more stages in liquid propylene over a residence time of 15 to 400 minutes under a pressure of 5 to 100 bar and at a temperature of 0° to 100° C. wherein only Catalyst-A not Catalyst-B of the mixed catalyst is activated for polymerization. The amorphous or elastomeric copolymer is prepared in a subsequent stage over a residence time of 10 to 180 minutes, under a pressure of 5 to 100 bar and at a temperature of 0 to 100° C. in the presence of ethylene in the gas phase wherein Catalyst-B of the mixed catalyst becomes activated for polymerization.

The following examples are presented to illustrate the foregoing discussion. All parts, proportions and percentages are by weight unless otherwise indicated. Ambient temperatures were used for the polymerization examples unless otherwise noted. Although the examples may be directed to certain embodiments of the present invention, they are not to be viewed as limiting the invention in any specific respect.

EXAMPLES

1. Preparation of Supported Catalyst (Method 1)

In a nitrogen purged glove box, 394 g of Davison 952 silica (1.55 cc/g pore volume; dried at 600° C. for at least 1 to 10 hours) is weighed into a 3-neck, 4-liter reactor equipped with an overhead stirrer. Two liters of dry toluene are added, and the mixture is vigorously stirred. 27.6 ml of N,N-diethyl aniline is added via syringe, followed by the addition of 86.0 g of solid tris(perfluorophenyl)boron. This mixture is allowed to stir for one hour. Then 5.99 g of dimethylsilylbis(2-methyl-4-phenylindenyl) zirconium dimethyl is added, and this mixture is allowed to stir two hours longer. The stirring is stopped, and the solids are allowed to settle. The supernatant liquid is decanted, and the solids are vacuum dried at room temperature overnight. The yield of supported catalyst should be approximately 423 g, with a loading of approximately 0.02 mmol of transition metal per gram of finished catalyst.

2. Preparation of the Supported Catalyst (Method 2)

48.5 grams of $SiO_2$, available from Grace Davison, a subsidiary of W. R. Grace Co.-Conn. as SYLOPOL®952 ("952 silica gel") having $N_2$ pore volume 1.63 cc/g and a surface area of 312 $m^2/g$, was dry mixed with 1.5 grams ammonium hexafluorosilicate (($NH_4)_2SiF_6$) available from Aldrich Chemical Company, Milwaukee Wis. The ammonium hexafluorosilicate added corresponds to 1.05 millimole F per gram silica gel. The mixture was transferred to a 5 cm ID by 50 cm vycor glass tube having a medium frit plug 3.8 cm from one end. The tube was inserted into a tube furnace and a flow of $N_2$ (220 cc/min) was passed up through the frit to fluidize the silica bed. The furnace was heated according to the following schedule.

Raise the temperature from 25 to 150° C. over 5 hours

Hold the temperature at 150° C. for 4 hours

Raise the temperature from 150 to 500° C. over 2 hours

Hold the temperature at 500° C. for 4 hours

Heat off and allow to cool under $N_2$

When cool the fluorided silica was stored under $N_2$. Neutron Activation Analysis, Nuclear Analytical Services, The University of Texas at Austin, showed 1.68±0.06 weight percent (wt %) fluorine. Also, the following compounds can be used with or in place of $(NH_4)_2SiF_6$: $NH_4BF_4$, $(NH_4)_2PF_6$, $NH_4F$.

3. Addition of Catalyst B to Supported Catalyst

In a glass vial equipped with a magnetic stirring bar, 76.7 mg of the compound $(Me_4Cp)SiMe_2(N-tBu)TiCl_2$ is dissolved in 15 ml of toluene. This solution is allowed to mix for 30 minutes. Concurrently, 10 grams of the supported catalyst solids prepared in Example 1 or 2 are placed in a stainless steel blender cup, equipped with a bottom mixer. The solution of the titanocene is added dropwise to the supported catalyst while it is being continuously stirred in the blender cup. The total volume of Ti-catalyst solution added to the supported catalyst is that required to achieve a pore volume loading of 97%. The wet solids are transferred into a rotoevaporator, and dried in vacuo at room temperature for at least 4 hours.

4. Polymerization of Homopolymer Isotactic Polypropylene (i-PP) Using the Catalyst from Example 1 (Comparative)

A 2-liter autoclave reactor previously flushed with nitrogen and containing triethylaluminum (0.25 ml of a 1M solution in hexane) and 1000 ml of propylene is heated to a temperature of 70° C. A 75 mg sample of the free flowing solid catalyst prepared according to Example 1 is slurried in 2 ml of hexane, and flushed into the reactor with 250 ml of additional propylene to start the reaction. After one hour, the reactor is cooled, vented and purged with nitrogen for 20 minutes prior to opening and recovering the homopolymer PP product. The product is transferred to a ceramic bowl, and allowed to dry one hour in a fume hood. The bowl is then placed in a vacuum oven, and allowed to dry an additional hour in vacuo at 75° C.

5. Polymerization of Homopolymer Isotactic Polypropylene (i-PP) Using the Catalyst from Example 3

The same polymerization procedure used in example 4 was employed, except that the catalyst used was the same catalyst produced in Example 3. Analysis of the results of the polymerization experiment and comparison with Example 4 as to yield, molecular weight, melting point of the product shows that the second catalyst component remains dormant throughout the course of this polymerization step.

6. Copolymerization Using the Catalyst from Example 3

A 2-liter autoclave reactor previously flushed with nitrogen and containing triethylaluminum (0.25 ml of a 1M solution in hexane) and 1000 ml of propylene is heated to a temperature of 70° C. A 75 mg sample of the free flowing solid catalyst prepared according to Example 3 is slurried in 2 ml of hexane, and flushed into the reactor with 250 ml of additional propylene to start the reaction. After one hour, the reactor is vented to a pressure of 170 psig to remove unreacted propylene monomer. Then 0.5 to 3.0 cc aliquot of a 30 wt % methylalumoxane solution (available from Albemarle Corporation) in toluene is added to the reaction and stirred for 10 min. for activation of Catalyst B. At this point, a constant flow of an ethylene/propylene gas mixture (80 mol % ethylene) is initiated to the reactor. The reactor pressure is maintained at 200 psig using a back pressure regulator on the reactor vent. The ethylene/propylene gas flow is maintained for another hour before it is turned off, and the reactor allowed to cool. The reactor is purged with nitrogen for 20 minutes prior to opening and recovering the product. The product is transferred to a ceramic bowl, and allowed to dry one hour in a fume hood. The bowl is then placed in a vacuum oven, and allowed to dry an additional hour in vacuo at 75° C.

7. Copolymerization Using the Catalyst from Example 1 (Comparative)

A 2-liter autoclave reactor previously flushed with nitrogen and containing triethylaluminum (0.25 ml of a 1M solution in hexane) and 1000 ml of propylene is heated to a temperature of 70° C. A 75 mg sample of the free flowing solid catalyst prepared according to Example 1 is slurried in 2 ml of hexane, and flushed into the reactor with 250 ml of additional propylene to start the reaction. After one hour, the reactor is vented to a pressure of 170 psig to remove unreacted propylene monomer. No additional activator is added. At this point, a constant flow of an ethylene/propylene gas mixture (80 mol % ethylene) is initiated to the reactor. The reactor pressure is maintained at 200 psig using a back pressure regulator on the reactor vent. The ethylene/propylene gas flow is maintained for another hour before it is turned off, and the reactor allowed to cool. The reactor is purged with nitrogen for 20 minutes prior to opening and recovering the product. The product is transferred to a ceramic bowl, and allowed to dry one hour in a fume hood. The bowl is then placed in a vacuum oven, and allowed to dry an additional hour in vacuo at 75° C.

Analysis of the results of the copolymerization experiments 6 and 7 (yield, molecular weight of the ethylene-propylene copolymer component, and flexural modulus) shows that the catalyst of this invention produces a copolymer composition with a better balance of physical properties than the catalyst of example 1 due in great part to the high molecular fraction contributed by the second catalysts species, counter to what is observed when Catalyst A alone is present in the second or final stage. Improvement in polymer properties is also improved over those achieved where a second catalyst species is added to a second, or subsequent reactor, in view of the better homogeneity of the polymer mix that is achieved with the invention process.

All priority documents are herein fully incorporated by reference for all jurisdictions in which such incorporation is permitted. Further, all documents cited herein, including testing procedures, are herein fully incorporated by reference for all jurisdictions in which such incorporation is permitted.

We claim:

1. A mixed catalyst composition for polymerizing monomers comprising a support, a least one first metallocene, Catalyst-A, an activator capable of rendering Catalyst-A active for olefin polymerization, a second metallocene, Catalyst-B, wherein if contacted with said Catalyst-B, said activator is incapable of activating Catalyst-B for olefin polymerization.

2. The composition of claim 1 wherein the activator comprises at least one NCA precursor.

3. The composition of claim 1 wherein the activator consists essentially of at least one NCA precursor.

4. The composition of claim 1 wherein the activator consists of at least one NCA precursor.

5. The composition of claim 1 wherein Catalyst-B is capable of being activated by an alumoxane.

* * * * *